United States Patent [19]

Dinerman

[11] Patent Number: 4,850,851
[45] Date of Patent: Jul. 25, 1989

[54] ANTI-BACKFLOW VALVE FOR INJECTION MOLDING MACHINES

[75] Inventor: Alex Dinerman, Cincinnati, Ohio

[73] Assignee: Cincinnati Milacron, Inc., Cincinnati, Ohio

[21] Appl. No.: 141,526

[22] Filed: Jan. 7, 1988

[51] Int. Cl.⁴ .............................................. B29C 45/23
[52] U.S. Cl. ...................................... 425/562; 425/564
[58] Field of Search ......................... 425/562, 563, 564

[56] References Cited

U.S. PATENT DOCUMENTS

| | | | |
|---|---|---|---|
| 3,007,202 | 11/1961 | Wucher | 425/30 |
| 3,550,208 | 12/1970 | Peters | 425/192 R |
| 3,888,393 | 6/1975 | Drori | 222/229 |
| 4,349,044 | 9/1982 | Schirmer | 137/512.3 |
| 4,377,180 | 3/1983 | Biljes | 137/528 |
| 4,477,242 | 10/1984 | Eichlseder et al. | 425/207 |

FOREIGN PATENT DOCUMENTS 2635144  2/1978  Fed. Rep. of Germany ...... 425/563

*Primary Examiner*—Jay H. Woo
*Assistant Examiner*—Timothy W. Heitbrink
*Attorney, Agent, or Firm*—Laurence R. Brown; Alfred J. Mangels

[57] ABSTRACT

An anti-backflow valve for mounting on the forward end of a plasticating screw of an injection molding machine. The valve includes a rod-like member that extends forwardly of the plasticating screw, and is relatively rotatable therewith. The rod-like member is axially retined in position relative to the screw by a retaining ring that engages with the forward end of the screw and that includes a valve seat. The outwardly extending end of the rod terminates in a stop that is spaced forwardly of the valve seat. An annular sealing ring includes an outer surface that engages the inner surface of the barrel and an inner surface that is radially spaced from the rod-like member to provide a flow passage therebetween. The ring is positioned between the forward stop and the valve seat and is freely axially movable therebetween. The relative rotation permitted between the rod and the rotating screw, coupled with the minimal rotation of the annular sealing ring relative to the barrel and with the stop, results in fewer wear surfaces and thereby permits the valve structure to be made from less wear-resistant, and therefore less expensive materials. Additionally, the ability of the screw to rotate relative to the rod-like member avoids breakage of the rod-like member tip during a cold start-up when solidified plastic material is present around the rod-like member.

15 Claims, 2 Drawing Sheets

FIG. 1
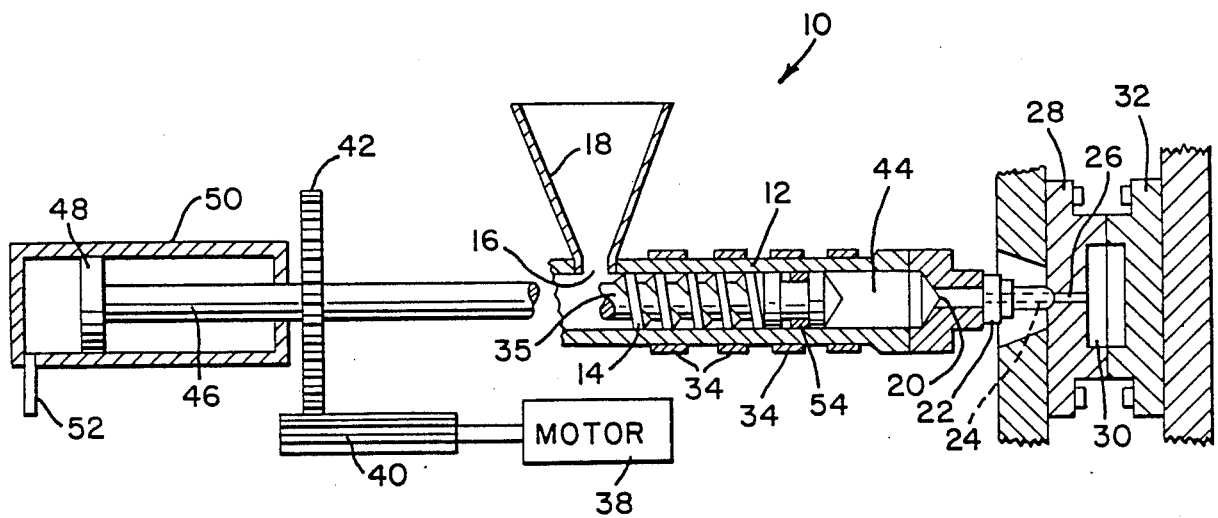
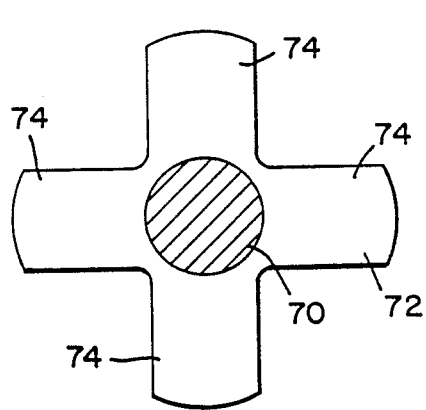
FIG. 4
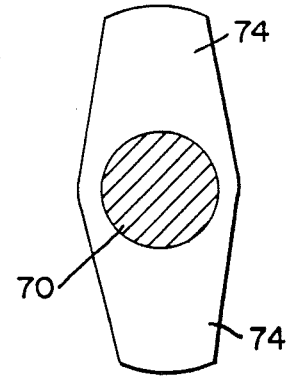
FIG. 5

ANTI-BACKFLOW VALVE FOR INJECTION MOLDING MACHINES

BACKGROUND OF THE INVENTION

1. Field of the Invention

This invention relates to the injection system of an injection molding machine, and more particularly to an anti-backflow valve positioned at the forward end of a plasticating screw to prevent backflow of plasticated material into the screw flights upon axial movement of the screw to effect injection of the plasticated material into a mold cavity.

2. DESCRIPTION OF THE RELATED ART

In plastic molding machines utilizing a plasticating screw to convey polymeric material through a heated barrel so that it undergoes softening and is capable of flowing, the screw is rotated to carry plasticated material to the forward end of the screw. As the material accumulates ahead of the screw, the screw is permitted to move axially rearwardly until a predetermined volume of plasticated material has been accumulated ahead of the screw. At that point rotation of the screw is terminated, and the screw is caused to travel axially toward an outlet in the barrel, to thereby force the plasticated material through the outlet and inject it into an adjacent mold cavity, whereupon a part of predetermined configuration can be formed upon cooling of the material in the mold cavity.

During the injection step, while the plasticating screw is moving axially toward the outlet of the barrel, it is necessary that backflow of plasticated material from the space ahead of the screw into the screw flights be prevented, so that the desired predetermined quantity of plasticated material is completely injected into the mold cavity in order to form a complete part.

Various types of non-return or anti-backflow valve structures carried on the forward end of a plasticating screw have been devised over the years, and one example of such a valve is illustrated and described in U.S. Pat. No. 4,377,180, which issued on Mar. 22, 1983, to William H. Biljes. The non-return valve described in that patent is carried at the forward tip of the screw and includes an annular ring that is slidable a limited distance along the direction of the screw axis. When the screw is rotating and is plasticating material, the annular ring is in a forwardmost position, and plasticated material is permitted to flow through the center portion of the ring. When axial movement of the screw toward the barrel outlet commences, the annular ring contacts a sealing surface on the axially moving screw, to close off the flow path between the screw flights and the forward portion of the screw, and thereby permit injection of a desired portion of the volume of plasticated material that has been accumulated ahead of the forward end of the screw. However, the Biljes structure, which is similar to a number of other non-return valve constructions, includes a tip, around which the annular ring is carried, and that tip is secured to the forward end of the screw and rotates with the screw. It has been found that at times when the machine is first started, and plastic material is solidified form is present within the barrel, unless the plasticated material has been softened by heating before rotation of the screw is initiated, it is possible for the tip of the screw to break because the tip is surrounded by and is tightly gripped by the solidified plastic material while the screw is being rotated. Additionally, because the screw tip serves as a forward stop for the annular sealing ring during plastication, and because there is relative rotational movement between the screw tip and the sealing ring, both the screw tip and the sealing ring are required to be made from hard, wear-resistant materials in order to avoid the need for frequent replacement of those parts because of wear.

It is an object of the present invention to overcome the problems attendant with the prior art anti-backflow valve constructions, and to provide a valve structure that permits the use of less expensive materials.

It is a further object of the present invention to provide an anti-backflow valve in which the screw tip will not break on start-up of screw rotation if the plastic material surrounding the tip during a cold start is not sufficiently softened.

Other objects and advantages of the present invention will become apparent from the ensuring description.

SUMMARY OF THE INVENTION

Briefly stated, and in accordance with one aspect of the present invention, an anti-backflow valve is provided for positioning on a forward end of a plasticating screw that is rotatably carried in a tubular barrel. The valve includes rod means that extends outwardly from the forward end of the plasticating screw, the rod means including a front end slidably received in the forward end of the screw to permit relative rotation between the rod means and the screw, and includes a second end that is spaced outwardly from the first end and positioned axially forwardly of the forward end of the screw. Retaining means are provided for retaining the rod means axially relative to the screw and for permitting relative rotation between the rod means and the screw. The retaining means includes an end facing outwardly of the forward end of the screw and defining a valve seat. Annular valve means are provided surrounding the rod means and spaced outwardly therefrom to define a flow passage therebetween. The valve means include an outer surface in substantial sealing engagement with the inner surface of the barrel, and include a sealing surface engageable with the valve seat. The valve means is movable axially relative to the retaining means. Stop means are provided and are carried by the rod means adjacent the second end of the rod means. The stop means includes a stop surface for limiting outward axial movement of the valve means relative to the retaining means.

BRIEF DESCRIPTION OF THE DRAWINGS

FIG. 1 is a fragmentary, schematic, cross-sectional view showing a portion of the injection system of a screw-type injection molding machine including a plasticating screw that incorporates an anti-backflow valve in accordance with the present invention at the forward end of the screw.

FIG. 4 is an end view of the screw tip of the plasticating screw of the machine illustrated in FIGS. 1 through 3, taken along the line 4—4 of FIG. 3.

FIG. 5 is an end view of another embodiment of a screw tip.

DESCRIPTION OF THE PREFERRED EMBODIMENTS

Figure 2:
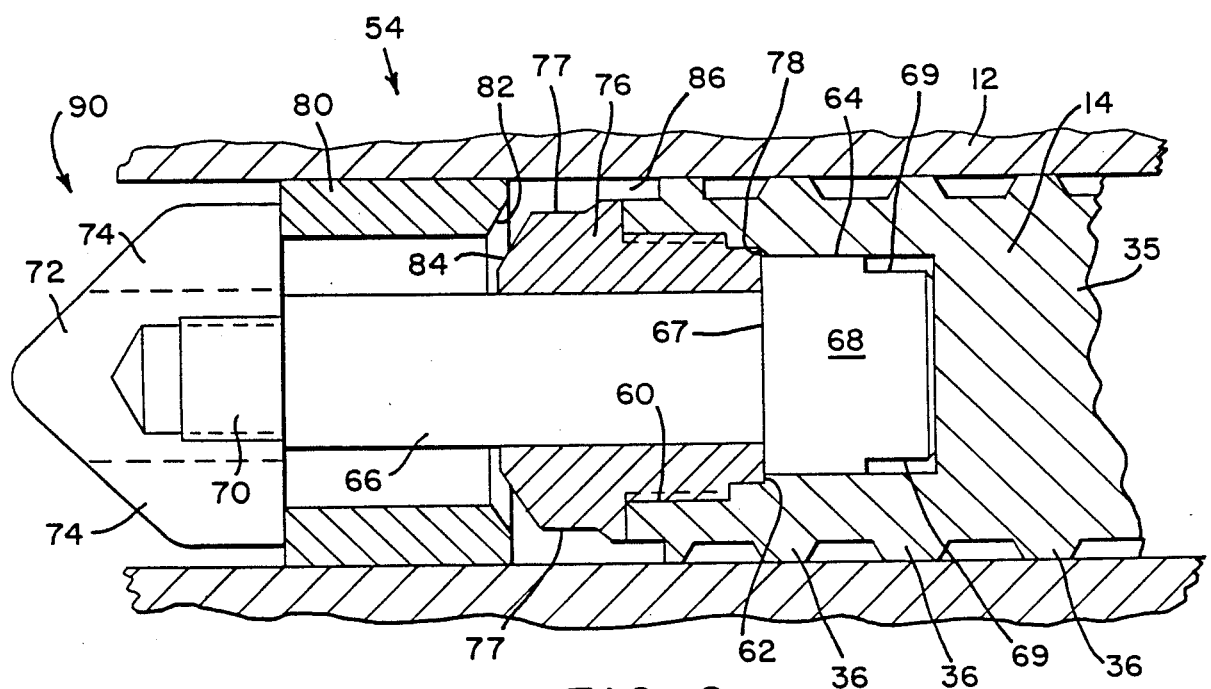
FIG. 2 is a enlarged, fragmentary, cross-sectional view of the forward end of the plasticating screw illustrated in FIG. 1, showing the anti-backflow valve in the open position to permit flow of plasticated material therethrough from the screw flights to the space ahead of the screw tip.

Referring now to the drawings, and particularly to FIG. 1 thereof, there is shown a portion of the plastication and injection section of a reciprocating screw injection molding machine 10. That machine includes a tubular barrel 12 within which a plasticating screw 14 is rotatably and axially slidably received. Barrel 12 includes a material inlet 16, and an upwardly extending, cone-shaped hopper 18 for receiving particles of polymeric material to be plasticated. Barrel 12 includes an outlet 20, to which an outlet nozzle 22 is secured, the nozzle having a passageway 24 that is in communication with a sprue 26 provided in one half 28 of a mold defined by a pair of cooperating mold halves 28 and 32. The mold halves together define a mold cavity 30, which communicates with sprue 26. A plurality of axially spaced, circumferentially positioned band heaters 34 are provided on barrel 12 to heat the barrel in order to soften the polymeric material and to cause it to become molten for injection into mold cavity 30. Although an external source of heat in the form of resistance band heaters is shown, it will be apparent to those skilled in the art that other forms of external heat sources can also be employed, if desired.

Plasticating screw 14 includes a generally cylindrical or conical body 35, around the outer periphery of which one or more helical screw flights 36 are provided. When rotated, screw 14 carried the particles of polymeric material from the barrel inlet 16 toward barrel outlet 20. During transit between those points within the barrel, the particles are softened, both by the heat generated as a result of the mechanical working action of plasticating screw 14 on the particles, as well as by the external heat supplied by band heaters 34. Screw 14 is rotated by a suitable motor 38 through a gear train 40, 42, and as the plasticated material is conveyed to the forward portion of the screw, toward barrel outlet 20, the softened material accumulates in volume 44 at the forward end of barrel 12, and as the volume of accumulated material increases, screw 14 is gradually pushed toward the left, as viewed in FIG. 1, away from nozzle 22, in which a shut off valve (not shown) is positioned. The rearmost end 46 of screw 14 includes a piston 48 that is slidably received within a cylinder 50. Hydraulic pressure is maintained on the rear face of piston 48, through conduit 52, to maintain a back pressure on the material being accumulated.

The softened plasticated material passes from the screw flights through an anti-backflow valve 54 positioned at the forward end of the screw, and to volume 44 at the forward end of barrel 12. When the desired quantity of plasticated material has been accumulated ahead of the screw, a quantity normally designated as a "shot," the rotation of the screw is stopped. High pressure hydraulic fluid is then introduced through conduit 52 into cylinder 50 against the rear face of piston 48 while the nozzle shut-off valve (not shown) is opened, to move screw 14 to the right, as viewed in FIG. 1, to cause the shot of plasticated material to flow through barrel outlet 20, nozzle 22, sprue 26, and into mold cavity 30. Pressure is maintained on the plasticated material in the mold until the mold has been cooled sufficiently so that the material within the mold is in a hardened condition. Thereupon, the nozzle shut off valve (not shown) is closed and the screw is again rotated to accumulate another shot and the cycle is successively repeated to provide successive molded parts.

Figure 3:
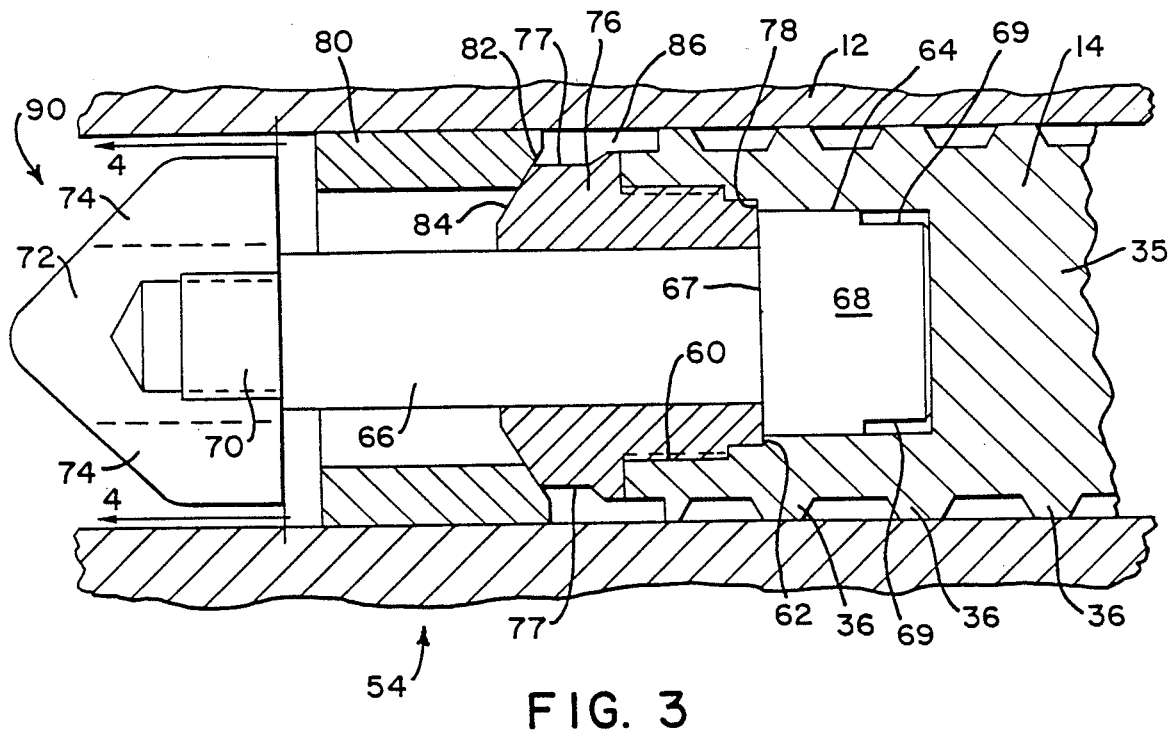
FIG. 3 is an enlarged, fragmentary, cross-sectional view similar to that of FIG. 2, showing the anti-backflow valve in the closed position to prevent flow of plasticated material therethrough.

Referring now to FIGS. 2 and 3, screw 14 is shown with its forwardmost end within barrel 12. In FIG. 2 the anti-backflow valve is in its open condition. Screw 14 includes a threaded opening 60 at its forwardmost end, and opening 60 terminates at an inner annular shoulder 62. Inwardly of shoulder 62 is a smooth, counterbored cylindrical surface 64 that is of smaller diameter than that of opening 60 and is coaxial with the screw axis and with opening 60. A stud or rod 66 that defines a carrier member includes an innermost cylindrical end 68 that is received in counterbore 64. The outer diameter of end 68 and the inner diameter of counterbore 64 are so selected as to permit relative rotation therebetween without binding. A reduced diameter end portion 70 of rod 66 extends outwardly beyond the forwardmost end of screw 14 and includes an external thread that receives a generally conically configured screw tip 72. An end view of screw tip 72 is illustrated in FIG. 4, and it includes two pairs of opposed, radially extending arms 74, the spaces between adjacent arms providing flow passages for plasticated material.

Referring once again to FIG. 2, an annular retaining ring 76 is threadably received in threaded opening 60 at the forwardmost end of the screw and surrounds rod 66. The retaining ring includes an inner end 78 that abuts shoulder 67 of rod 66 to prevent outward movement of rod 66 in an axial direction relative to screw 14. Again, the connections between the parts are such that the rod 66 is capable of rotation relative to both screw 14 and retaining ring 76.

Positioned between retaining ring 76 and screw tip 72 is an annular sealing ring 80 that has an outer diameter substantially equal to the inner diameter of barrel 12 to provide a seal therewith and to prevent flow therebetween. The inner diameter of sealing ring 80 is greater than the outer diameter of rod 66 to permit flow therebetween. The forwardmost portion of sealing ring 80, relative to screw 14, is in abutting engagement with the rear faces of arms 74 of screw tip 72, and the innermost portion of sealing ring 80, relative to screw 14, includes a frustoconical sealing surface 82 that is adapted to engage with a corresponding frustoconical sealing surface 84 formed on the forward face of retaining ring 76 to prevent flow therebetween when the two sealing surfaces are in contacting relationship.

Cylindrical end 68 of rod 66 includes a pair of flat surfaces 69 spaced 180° apart for receiving a wrench to facilitate assembly of screw tip 72 to rod 66. Similarly, retaining ring 76 includes a pair of flat surfaces 77 spaced 180° apart for receiving a wrench to facilitate assembly of retaining ring 76 to screw 14. When retaining ring 76 is tightened, rod 66 is axially restrained but is capable of relative rotation with screw 14.

As can be seen in FIG. 2, plasticated material can be moved along the flights of the screw (from right to left as viewed in FIG. 2) to an annular passageway 86 defined between barrel 12 and the radially outermost surface of retaining ring 76. Thereupon, because the plasticated material is under pressure, it acts against the sealing surface 82 and urges sealing ring 80 in a forward direction, relative to screw 14, until ring 80 rests against the stop surfaces defined by radial arms 74 of screw tip 72. The material then passes from passageway 86, past sealing surfaces 82 and 84, into the annular space between sealing ring 80 and rod 66, and then through the spaces between the respective radial arms 74 on screw tip 72.

Because of the connections and fit between the respective parts as earlier described, there is preferably little or no relative rotation between screw tip 72 and sealing ring 80 when screw 35 is rotating during the plastication operation. Consequently, sealing ring 80 and screw tip 72 can be made from relatively inexpensive nitralloy or tool steel, instead of from the more costly wear resistant materials, such as carbides, normally required in a screw tip anti-backflow valve in which there is relative rotation between the screw tip and the annular sealing ring. Additionally, if an injection molding machine that includes the present anti-backflow valve structure were to be started in a cold start condition, in which solidified polymeric material from an earlier operating cycle surrounds the screw tip and has not been sufficiently softened, breakage of the screw tip is avoided because screw tip 72 can remain stationary by virtue of the relative rotation permitted between rod 66 and plasticating screw 35.

Referring now to FIG. 3, which shows the position of the parts during the injection step, when the anti-backflow valve is closed, sealing ring 80 is spaced rearwardly from screw tip 72, and sealing surface 82 is in abutting engagement with sealing surface 84 on retaining ring 76. That engagement is brought about by forward axial movement of screw 14 toward the left, as viewed in FIGS. 2 and 3, and the resulting contact between the sealing ring and the retaining ring seals off annular passageway 86 around the periphery of the screw from plasticated material collection area 90 forward of screw tip 72. Consequently, continued leftward movement of the screw relative to the barrel will cause the accumulated plasticated material ahead of the screw tip to be injected into the mold cavity without any backflow of the material through annular passageway 86 and into the screw flight area.

Because screw tip 72 also functions as a forward stop for sealing ring 80, it need not have the four arm configuration illustrated in FIG. 4. Instead, the two arm configuration illustrated in FIG. 5 can also be utilized, which requires less metal and also provides a larger flow area for the plasticated material. Thus, as will be apparent, although the FIG. 4 embodiment includes four circumferentially spaced stop surfaces for the sealing ring, the FIG. 5 embodiment includes only two such stop surfaces.

It will thus be apparent that the present invention provides an improved anti-backflow valve that can be fabricated from relatively inexpensive materials, because of fewer wear surface areas between the respective parts of the valve structure, as compared with previously-used valves.

Although particular embodiments of the present invention have been illustrated and described, it will be apparent to those skilled in the art that various changes and modifications can be made without departing from the spirit of the present invention. It is therefore intended to encompass within the appended claims all such changes and modifications that fall within the scope of the present invention.

What is claimed is:

1. Injection molding apparatus comprising:

(a) a tubular barrel having an inner surface and including a material inlet and a material outlet spaced axially from the material inlet;
   (b) a plasticating screw rotatably and slidably supported in the barrel for plasticating polymeric material and for conveying said material within the barrel from the material inlet to the material outlet, the screw including a forward end facing toward the material outlet;
   (c) flow control means carried by the plasticating screw at a forward end of the screw adjacent the material outlet, the flow control means including rod means extending outwardly from the forward end of the screw and rotatable relative to the screw while the screw is rotating to plasticate polymeric material, retaining means for defining a valve seat and for axially retaining the rod means in position on the forward end of the screw to permit relative rotation between the rod means and the screw while the screw is rotating to plasticate polymeric material, valve means surrounding the rod means and spaced radially outwardly therefrom to define a flow passage therebetween and including a sealing surface engageable with the valve seat to prevent flow of plasticated material past the valve seat, the valve means movable axially relative to the rod means between a first position in which the valve means sealing surface is in sealing engagement with the valve seat and a second position in which the valve means sealing surface is spaced from the valve seat to permit flow therebetween, and stop means carried by the rod means and spaced axially forwardly from the valve seat for limiting forward axial movement of the valve means relative to the rod means.

2. Injection molding apparatus in accordance with claim 1, wherein the valve means sealing surface is frustoconical.

3. Injection molding apparatus in accordance with claim 1, wherein the valve seat is frustoconical.

4. Injection molding apparatus in accordance with claim 3, wherein the valve means sealing surface is frustoconical.

5. Injection molding apparatus in accordance with claim 1, wherein the retaining means is removably carried by the screw to permit separation of the rod means from the screw.

6. Injection molding apparatus in accordance with claim 5, wherein the retaining means is threadably received in the forward end of the screw.

7. Injection molding apparatus in accordance with claim 1, wherein the rod means includes a first end and the forward end of the screw includes a bore for rotatably receiving the first end of the rod means.

8. Injection molding apparatus in accordance with claim 7, wherein the rod means includes a body portion and the first end extends radially outwardly beyond the body portion.

9. Injection molding apparatus in accordance with claim 1, wherein the valve means is an annular ring having an outer cylindrical surface engageable in substantial sealing relationship with the inner surface of the barrel.

10. Injection molding apparatus in accordance with claim 9, wherein the annular ring is substantially concentric with the rod means and includes an inner cylindrical surface spaced radially outwardly from the rod means to define a substantially uniform annular flow passage therebetween.

11. Injection molding apparatus in accordance with claim 1, wherein the rod means includes a second end spaced axially from the first end, and the stop means is removably carried at the second end of the rod means.

12. Injection molding apparatus in accordance with claim 11, wherein the stop means defines a substantially conical tip and includes a plurality of radially outwardly extending flutes that define axial flow passages between the tip and the barrel.

13. Injection molding apparatus in accordance with claim 11, wherein the stop means includes at least one transversely extending stop surface.

14. An anti-backflow valve for positioning on a forward end of a plasticating screw rotatably and axially slidably carried in a barrel, said valve comprising:
 (a) rod means extending outwardly from an end of the plasticating screw, the rod means including a first end slidably received in the end of the screw to permit relative rotation between the rod means and the screw while the screw is rotating to plasticate material, the rod means including a second end spaced axially from the first end and positioned axially outwardly of the end of the screw;
 (b) retaining means carried by the screw for retaining the rod means axially relative to the screw and for permitting relative rotation between the rod means and the screw while the screw is rotating to plasticate material, the retaining means including an end facing outwardly of the end of the screw and defining a valve seat;
 (c) annular valve means surrounding the rod means and spaced radially outwardly therefrom to define a flow passage therebetween, the valve means including an outer surface in substantial sealing engagement with the barrel and including a sealing surface engageable with the valve seat, the valve means being freely movable axially relative to the retaining means; and
 (d) stop means carried by the rod means and adjacent the second end of the rod means, the stop means including a stop surface for limiting axial movement of the valve means away from the retaining means.

15. A valve in accordance with claim 14, wherein the stop means includes at least one substantially radially extending stop surface.

* * * * *